UNITED STATES PATENT OFFICE.

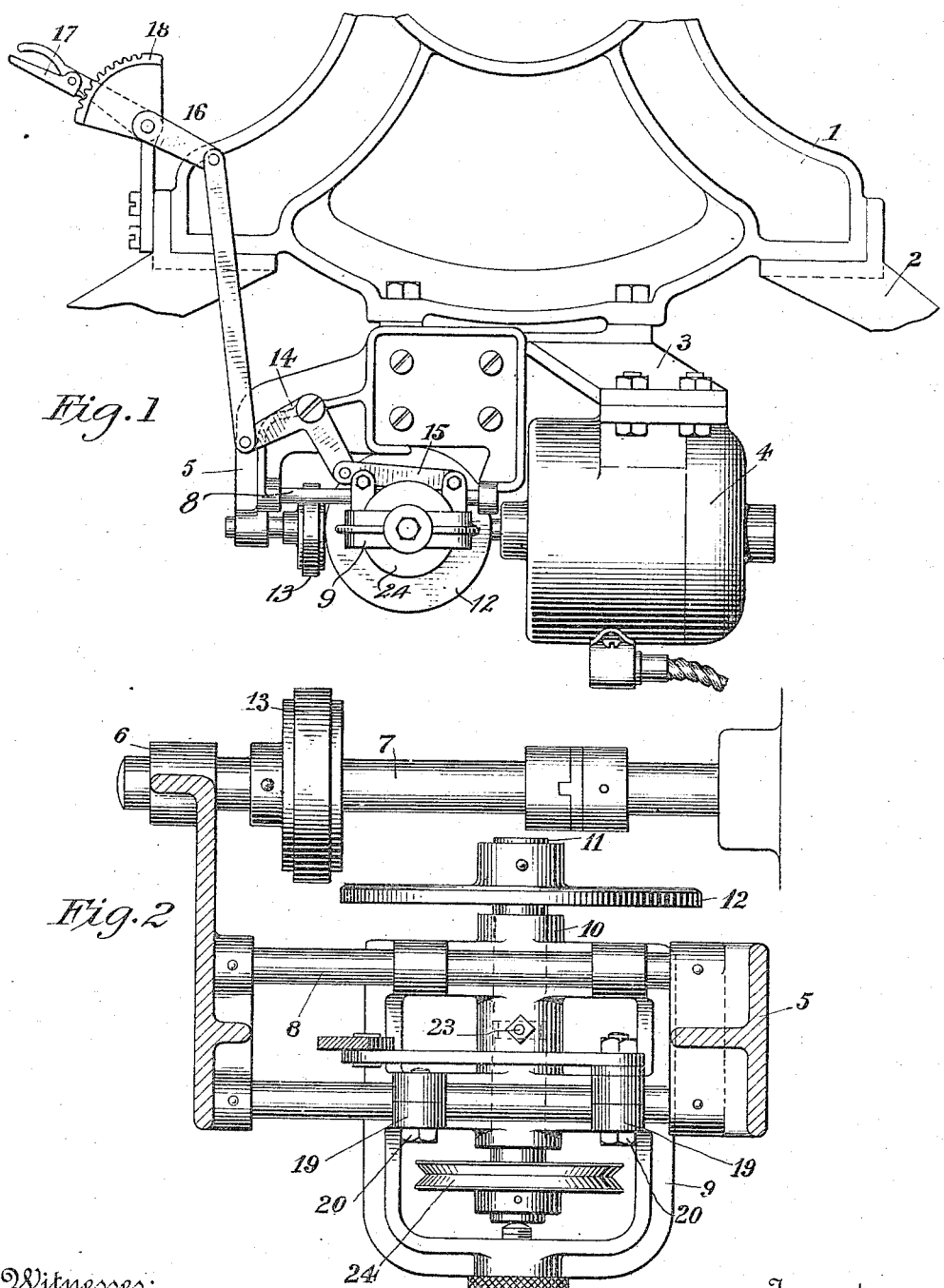

NICHOLAS POWER, OF BROOKLYN, NEW YORK, ASSIGNOR TO NICHOLAS POWER COMPANY, OF NEW YORK, N. Y., A CORPORATION OF DELAWARE.

MOTOR DRIVING MECHANISM.

1,242,976.     Specification of Letters Patent.     Patented Oct. 16, 1917.

Application filed July 14, 1914. Serial No. 850,872.

*To all whom it may concern:*

Be it known that I, NICHOLAS POWER, a citizen of the United States, residing in Brooklyn, county of Kings, and State of New York, (whose post-office address is #388 Jefferson avenue,) have invented new and useful Improvements in Motor Driving Mechanism, of which the following is a specification.

This invention relates to motor driving mechanism of a character especially adapted for operating moving picture projecting machines. The object of the invention is to provide a motor drive of this character which will be free from vibration and in which the speed of the driven shaft may be varied as desired with perfect smoothness, so as not to injure the fragile film.

A further object of the invention is to provide a motor drive of this character in which the driving tension may be accurately regulated to furnish sufficient power to drive the mechanism but will slip under abnormal strain so as not to mutilate the film.

With the above objects in view my invention consists of the construction shown in the accompanying drawings and hereinafter described, and in said drawings—

Figure 1 is a side elevation of my improved motor drive showing the same attached to the base of the moving picture machine;

Fig. 2 is a plan view partly in section of the friction gear employed in the drive.

Referring to the drawings, 1 represents a portion of the frame which supports on its upper part, not shown, the projecting mechanism. Suspended from the frame 1 between the legs 2 thereof is a hanger 3 to which is rigidly attached at one end the electric motor 4 for furnishing the driving power. Attached to the other end of the hanger 3 is a bracket 5 having a bearing 6 on its lower edge in which is supported the free end of the motor shaft 7. Parallel with the motor shaft and slightly above and to one side of the shaft are two parallel rods or tracks 8 fixedly supported in the bracket 5, and slidingly mounted on the rods 8 is a carriage 9 having on its under side a long journal bearing 10 at right angles to the shaft 7. The driven shaft 11 of the friction gear is rotatably mounted in the bearing 10 and carries on its free end a friction disk 12 which is driven from a friction wheel 13 fast to the driven shaft and adapted to engage with its periphery the lateral face of the disk 12.

The position of the wheel 13 on the shaft 7 is such that when the carriage 9 is adjusted to its extreme position in one direction, the periphery of the wheel 13 will lie beyond the edge of the disk 12 and the driving connection between the parts will be broken. When the carriage is adjusted in the opposite direction the face of the disk 12 at its outer surface will first engage the wheel 13, thereby starting the driven shaft at its lowest speed. The continued adjustment of the carriage 9 toward its extreme position at the opposite end of the tracks 8 will gradually increase the speed of the driven shaft to the desired maximum speed.

For shifting the carriage 9 I provide a lever mechanism consisting of a bell-crank lever 14 pivoted upon the bracket 5 and connected by a link 15 with an upwardly projecting ear on the carriage 9. The other arm of the bell-crank 14 is connected by a suitable link to the hand lever 16 pivoted on the frame 1 and having a grip latch 17 coacting with the ratchet quadrant 18 to lock the lever in any desired position of adjustment.

In order that the carriage 9 may have the desired resistance to movement, so that the carriage will not be adjusted too rapidly, or beyond the desired position, the hangers 19 by which the carriage is suspended from one of the rods 8 are split and provided with ears for receiving suitable clamping bolts 20, whereby the hangers may be clamped in any desired degree of friction on the rods 8. The link 15 may conveniently be pivoted on one of the bolts 20 as shown.

For adjusting the pressure of the disk 12 against the wheel 13 to vary the degree of tension that may be placed upon the film, the shaft 11 is slidingly mounted in the bearing 10 and is engaged at its end by a set screw 21 threaded in the frame 9 and provided with a suitable clamping nut 22. To prevent the shaft slipping away from the adjusting screw a screw 23 is provided, working in a circumferential slot on the shaft, of sufficient width to permit the desired range of adjustment and at the same time prevent the disk moving beyond the position where its beveled edge will ride up on the periphery of the wheel 13.

For driving the projecting mechanism the shaft 11 is provided with a driving pulley 24 for receiving the driving belt of the projecting machine.

The operation of the device will be obvious from the above description and need not be further described. The gear has been found in practice to provide a very smooth drive which is essential for apparatus of this character. The starting is effected with the point of engagement of the friction wheel at the outer circumference of the disk where the difference in the line of movement of the faces is slight, and hence where there is practically no "grinding" such as produces a jerky drive and vibration when the load is started with the wheel too close to the center of rotation of the disk. When the construction is reversed, the engaging faces must be brought together at a short radius of the disk to prevent an abrupt start.

Another advantage over the friction gear of the type in which the disk is the driving instead of the driven member is that the parts may be entirely separated when the machine is not in operation.

Having thus described my invention, what I claim and desire to secure by Letters Patent is:

1. In a motor driving mechanism, the combination of a driving shaft, a friction wheel mounted thereon, a driven shaft at right angles to the driving shaft, a friction disk thereon and means for shifting the driven shaft bodily in a direction parallel with the driving shaft to bring the wheel and disk into and out of engagement.

2. In a motor driving mechanism, the combination of a driving shaft, a friction wheel mounted thereon, a driven shaft at right angles to the driving shaft, a friction disk thereon, means for shifting the driven shaft bodily in a direction parallel with the driving shaft to bring the wheel and disk into and out of engagement, and means for adjusting the driven shaft longitudinally of its length for varying the driving pressure between the wheel and disk.

3. In a motor driving mechanism, the combination of a suspension hanger, a driving motor depending therefrom, a pair of guide tracks carried by said hanger parallel with the shaft of said driving motor, a carriage slidingly mounted on said tracks and having a journal bearing at right angles to said motor shaft, a driven shaft in said journal bearing, and a friction wheel and friction disk mounted on said motor shaft and said driven shaft respectively, the range of movement of the driving shaft being sufficient to permit adjustment of the wheel beyond the periphery of the disk to disconnect the members.

4. In a motor driving mechanism, the combination of a suspension hanger, a driving motor depending therefrom, a pair of guide tracks carried by said hanger parallel with the shaft of said driving motor, a carriage slidingly mounted on said tracks and having a journal bearing at right angles to said motor shaft, a driven shaft in said journal bearing, a friction wheel and friction disk mounted on said motor shaft and said driven shaft respectively, means for adjusting said carriage along said tracks, and means for opposing a variable frictional resistance to the adjustment of said carriage.

Signed at New York in the county of New York and State of New York this 29th day of June, 1914.

NICHOLAS POWER.

Witnesses:
W. B. MORTON,
EDWARD EARL.